UNITED STATES PATENT OFFICE.

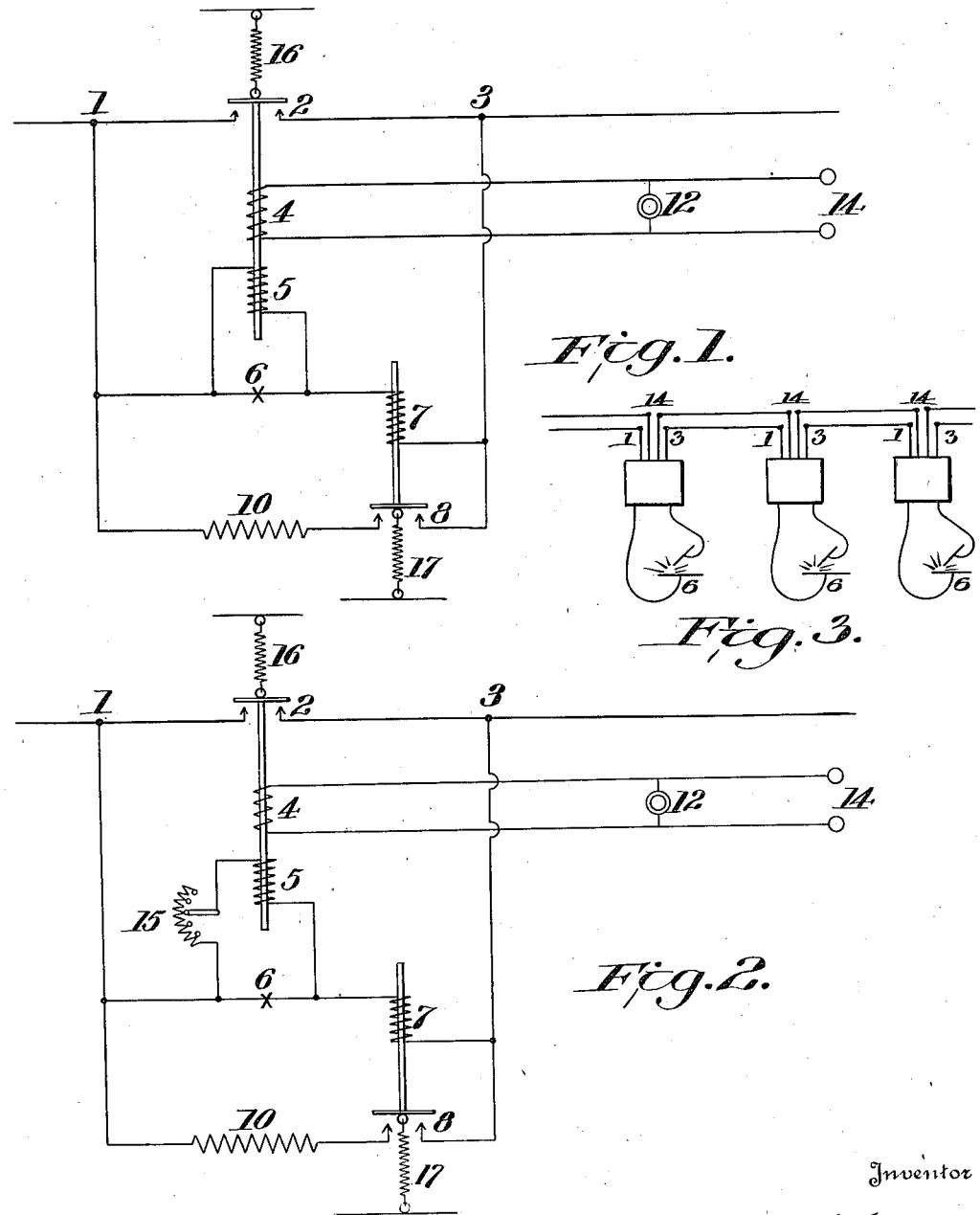

OTIS ALLEN KENYON, OF NEW YORK, N. Y.

ELECTRIC WELDING.

1,218,265.    Specification of Letters Patent.    Patented Mar. 6, 1917.

Application filed June 28, 1916. Serial No. 106,422.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

My invention relates to the art of electric welding, and it consists of the parts and the arrangements and combinations of parts substantially as I will hereinafter describe and claim.

In the accompanying drawings forming part of this specification, I show for purposes of illustration two systems, one a modification of the other and both capable of carrying out my invention, but it will be understood that said invention is intended to include other and different arrangements, and in fact any arrangement of parts capable of producing like results and coming within the scope of the hereinafter recited claims.

Figure 1 illustrates more or less diagrammatically a circuit for a system capable of carrying out my invention.

Fig. 2 illustrates a similar system to which is added a means for adjusting the voltage limit across the arc.

Fig. 3 illustrates several of the apparatus in series connection.

In order that the present invention may be fully understood, and the value of the same appreciated, I will state that although electric arc welding is one of the oldest practical applications of electricity, it has apparently not come into the general use it might have, had it been better understood, and the welding current better controlled.

Heretofore, two general systems of electric distribution have been employed in electric arc welding; namely, the constant-potential system and the constant-current system. The first named system, namely, the constant-potential system, is the oldest and is universally used where more than one welder operates from the same machine. The constant-current system may properly be sub-divided into two types; namely, the open circuit and the closed circuit. The open-circuit system which is well known in the art is limited to use with one arc on each machine; it has other draw-backs, which I will hereinafter mention. The closed circuit constant-current system was, apparently, first disclosed in my prior Patent No. 1,181,227, dated May 2, 1916, which system has opened great possibilities in the way of heat control which exist in no other system of which I have knowledge.

That the advantages to be derived from the proper control of the heat effects in the welding arc may be better understood, it is desirable at this time to consider the factors which enter into said control. It is known that the rate of total heat production in the arc is equal to the power in watts consumed between the terminals of the arc, but the temperature of the metal is not simply nor directly related to the watts consumed. In order to control the temperature of the metal, it is necessary then to take into account all of the factors that determine it. Therefore, it may be well to analyze briefly, the production of heat in an electric welding arc.

Beginning with the pencil point which ordinarily, but not necessarily, is connected to the negative side of the circuit, we find that the temperature produced here depends upon the power in watts consumed at this point; that is, upon the product of the current through the arc and the E. M. F. drop at the terminal of the arc. Experience has shown that the E. M. F. drop at each terminal of the arc is practically constant, and independent of the current; that is, the resistance at each terminal of the arc decreases when the current increases, and vice versa, which accounts for the instability of a metallic arc when connected to a source of constant-potential, and this is the reason why it must be connected in series with a relatively large resistance. Therefore, since the E. M. F. is constant, the temperature of the metal at the pencil point, in other words, the flow of the metal from the pencil point depends almost entirely upon the current alone.

Again, the temperature of the metal in the arc stream is determined by the power consumed in the stream, and by the rate of flow from the pencil.

The resistance of the arc stream seems to be approximately constant per unit of length, so that the E. M. F. consumed is directly proportional to the length of the arc. This is the reason that a carbon arc with a long stream can be operated from a constant-potential source without a series resistance. The resistance of the arc stream takes the place of an external resistance and stabilizes the arc sufficiently to prevent its being extinguished. The power consumed in the arc is the product of the current through the arc and the voltage drop in the stream; while the flow of metal is determined by the current, as above indicated. Since the resistance of the stream is directly proportional to its length, the length of the arc is fixed by the voltage impressed across it. Therefore, in order to control the temperature of the metal in the stream, we must control both the current and the E. M. F. and each independently of the other.

The temperature at the end of the arc where it impinges upon the work depends upon the rate of flow of the metal, the temperature of the metal that arrives, and upon the rate at which energy is produced in the terminal itself, as well as upon the heat dissipating capacity of the mass surrounding the point where the metal is deposited. I have heretofore considered the origin of the heat brought in by the molten metal itself, and I will here state that the heat produced at this terminal of the arc is exactly similar to that produced at the other terminal; that is, it depends upon the current through the arc. Therefore, it will be seen that the final temperature of the metal depends upon both the current and the E. M. F., and that the value of each must be controlled independently, if anything like accurate results are to be obtained while still retaining the flexibility of application.

With this general statement of the prior art and the requirements thereof, I will state that an essential object of the present invention is to adjust and control the heat effect of the arc, by means of voltage limitation. More specifically, the leading characteristic of the present invention is to arrange the relay which is shunted across the arc in such a way that it short circuits the arc itself and in this way kills at once the E. M. F. impressed upon the arc, and herein lies a radical difference over the prior art, because in the latter, the relay when used, operated to place an E. M. F. across the arc which increased as the arc was drawn out, until it broke; in the present invention, the first action of the relay is to kill the E. M. F. across the arc completely and thus absolutely remove any chance of burning the metal.

As before stated, I have shown in the drawing two systems of carrying out the present invention. In Fig. 1, I illustrate a circuit diagram for a system whose arrangement is adapted to carry out my invention; the terminals, 1 and 3 are connected in a circuit which carries a constant current, or a regulated current; by regulated current I mean a current which is automatically regulated in such a way that a short circuit will not cause a destructive rise in current. Normally, the terminals 1 and 3 of the circuit are closed through a short circuiting contact, 2, which is held closed by a solenoid coil, 4, connected to a separate source of energy, 14.

Connected to the terminals 1 and 3 is a resistance, 10, which is in series with a contactor, 8, of any well known and appropriate construction, and the arc circuit 6 and 7, is in parallel therewith, the part 7 representing a solenoid coil of appropriate construction.

The contactor 8 is normally closed, but no current passes that way on account of the fact that the closure at the short circuiting contact, 2, reduces the voltage drop between the terminals 1 and 3 to practically nothing.

Arranged in circuit with the solenoid coil 4 is an appropriate push button 12 or equivalent switch member of any suitable well known type and which upon being depressed or closed during the operation of the system, short circuits the coil 4, and releases the contact, 2, under the pull of an appropriate spring 16, to which said contact is connected. In this arrangement of the parts it will be apparent that the current in the main circuit must pass from the terminal 1 through the resistance 10, and the contactor, 8, and finally back to the terminal 3, the current through the resistance 10, producing a drop in the E. M. F. between the terminals 1 and 3. Now, if the terminals of the arc 6 are brought together, the resistance through that circuit will be so much less than that through the resistance 10, and the contactor, 8, that a large proportion of the current will immediately pass through the arc circuit, 6 and 7, and in doing so, the solenoid coil 7, is energized and thereby opens the contactor, 8, so as to leave the arc 6 as the only path through which the main circuit is maintained and therefore carrying all the current.

As the arc is lengthened and shortened in operation, more or less of the current is designed to be shunted and this may be effected through the employment of the solenoid or coil, 5, which is retained in such relation to the coil 4, that said coils 4 and 5, assist each other in pulling against the spring, 16, to which the solenoid core is connected, and whenever the E. M. F. across the arc circuit 6 rises sufficiently, it will shunt enough current through the solenoid coil 5, so that the combined pull of this coil and the coil 4 will overcome the tension of the spring, 16, to which the core of said coils is connected, and short circuit the arc, by closing the contactor 2, which operation prevents absolutely any further rise in E. M. F., and kills the arc without any possibility of temperature increase which will burn the metal. The coil, 4, holds the contactor, 2, in its closed position, thus killing the arc, 6, and coil, 7, whereupon the contactor, 8, is again closed under the action of its spring, 17, thereby leaving the control circuit in exactly the same condition as at the beginning of the operation; that is, ready to begin welding. It is readily seen that the circuits herein described and shown are connections of a controller which may be used in a closed circuit-series system, such as described in my prior patent before alluded to, which may consist of two or more arcs, but obviously a single arc may be used when fed from a constant current generator and where it is desired to limit the voltage by short circuiting and uninterruptedly maintaining said short circuit.

In the modified system of Fig. 2, is shown a controller similar in every material respect to that shown in Fig. 1, except that in Fig. 2, I have added means for adjusting the voltage limit across the arc. The means include a rheostat 15, of suitable construction and arrangement and by adjusting this rheostat so as to include different values of resistance, in series with the solenoid coil, 5, the value of the E. M. F. across the arc which will cause the contactor, 2, to close, will vary accordingly.

It is advantageous to be able to adjust the E. M. F. limit, because it requires more skill to operate with a low limit than with a high one. Also, different kinds of work will require a change in the limiting E. M. F., consequently, the adjustment of the E. M. F. makes the system more flexible by adapting it to the skill of the workmen as well as to the requirements of the operator.

Having thus described my invention what I claim as new and desire to secure by Letters Patent is:—

1. In electric welding, a series of regulated current welding arcs, in combination with means controlled by the voltage across each arc to short circuit said arc at a predetermined voltage.

2. In electric welding, a regulated current welding arc, in combination with means controlled by voltage across the arc to short circuit the arc at a predetermined voltage, and means for uninterruptedly maintaining the short-circuit.

3. In electric welding, a series of regulated current welding arcs, a coil connected in parallel with each arc and carrying current proportionate to the voltage across each arc, and means controlled by the current in said coil to short circuit said arc at a predetermined voltage.

4. In electric welding, a regulated current welding arc, a coil connected in parallel therewith and carrying current proportionate to the voltage across the arc, and means controlled by the current in said coil to short circuit the arc at a predetermined voltage, and a second coil separately excited and constructed to hold the short circuit until released.

5. In electric welding, a regulated current welding arc, means for short circuiting said arc when the voltage across the arc reaches a certain predetermined limit, and means for adjusting this limit.

6. In electric welding, a regulated current welding arc, a coil connected in parallel therewith and carrying current proportionate to the voltage across the arc, and means controlled by the current in said coil to short circuit the arc at a predetermined voltage, and a rheostat in series with said coil to adjust said voltage.

In testimony whereof I affix my signature.

OTIS ALLEN KENYON.